(12) United States Patent
Kliewer et al.

(10) Patent No.: US 9,022,065 B1
(45) Date of Patent: May 5, 2015

(54) PRESSURE EVENT INDICATOR AND SYSTEMS INCORPORATING THE SAME

(71) Applicant: California Controlled Atmosphere, Dinuba, CA (US)

(72) Inventors: Jay Kenan Kliewer, Dinuba, CA (US); Gordon Dean Brandt, Kingsburg, CA (US)

( * ) Notice: Subject to any disclaimer, the term of this patent is extended or adjusted under 35 U.S.C. 154(b) by 0 days.

(21) Appl. No.: 14/319,011

(22) Filed: Jun. 30, 2014

(51) Int. Cl.
| | |
|---|---|
| *E03B 7/07* | (2006.01) |
| *F16K 37/00* | (2006.01) |
| *F17D 3/00* | (2006.01) |
| *F16K 17/20* | (2006.01) |
| *G01F 15/00* | (2006.01) |

(52) U.S. Cl.
CPC .................................. *F16K 37/0008* (2013.01)

(58) Field of Classification Search
CPC ................................................. F16K 37/0008
USPC ................. 137/552, 556, 557, 554, 459, 467, 137/527.8; 73/861.75; 116/274, 275, 277
See application file for complete search history.

(56) References Cited

U.S. PATENT DOCUMENTS

| | | | | |
|---|---|---|---|---|
| 447,594 | A | * | 3/1891 | Williams ..................... 73/861.75 |
| 542,643 | A | * | 7/1895 | Heyman ......................... 137/554 |
| 607,286 | A | | 7/1898 | Sharp |
| 819,185 | A | | 5/1906 | Vincent |
| 1,239,015 | A | * | 9/1917 | Key ................................ 137/467 |
| 1,712,760 | A | * | 5/1929 | Furnivall et al. ............ 73/861.75 |
| 1,905,146 | A | * | 4/1933 | Chapin ....................... 200/81.9 R |
| 2,115,628 | A | * | 4/1938 | Fredericks ..................... 137/467 |
| 2,167,321 | A | | 7/1939 | Abercrombie |
| 2,310,447 | A | * | 2/1943 | Larson ........................... 137/467 |
| 2,418,727 | A | | 4/1947 | Rosenston et al. |
| 2,655,177 | A | | 10/1953 | Ryon |
| 3,230,971 | A | * | 1/1966 | Rosaen ....................... 137/556.3 |
| 3,701,362 | A | | 10/1972 | Reese |

(Continued)

FOREIGN PATENT DOCUMENTS

| | | |
|---|---|---|
| EP | 1512897 B1 | 6/2006 |
| WO | 2008117344 A1 | 10/2008 |

OTHER PUBLICATIONS

Duboy et al., Valve system with position indicator, English Abstract of European Patent Publication EP1512897, Jun. 7, 2006, European Patent Organization, http://www.epo.org/searching/free/espacenet.html.

(Continued)

*Primary Examiner* — Craig Schneider
*Assistant Examiner* — Josephine Trinidad-Borges
(74) *Attorney, Agent, or Firm* — Marcus N. DiBuduo

(57) ABSTRACT

The present invention includes pressure event indicators that identify specific pressurized vessels or pipes from which a pressurized fluid has been exhausted, closed pressurized systems that implement such pressure event indicators, and methods of using such pressure event indicators. Embodiments of such pressure event indicators may include a housing having a substantially horizontal elongate passage, a rotatable axle orthogonally passing through the passage, a paddle fixedly attached to the axle having a closed position, an open position, and a shape that is complementary to a portion of the passage and that occludes a portion of the passage when the paddle is in the closed position, and at least one visual indicator outside of the housing and fixedly attached to the axle, where the purpose of the visual indicator is to identify a position of the paddle to an observer.

30 Claims, 4 Drawing Sheets

(56) References Cited

U.S. PATENT DOCUMENTS

| | | |
|---|---|---|
| 4,074,696 A | 2/1978 | Romanowski |
| 4,940,011 A | 7/1990 | Wilkerson et al. |
| 5,076,308 A | 12/1991 | Cohen |
| 5,577,389 A * | 11/1996 | Albertson et al. ............. 62/115 |
| 5,664,601 A | 9/1997 | Chen |
| 6,152,173 A | 11/2000 | Makowan |
| 7,108,010 B2 | 9/2006 | Trentadue |
| 7,533,693 B2 | 5/2009 | Colton, Jr. et al. |
| 8,465,001 B2 | 6/2013 | Witkowski et al. |
| 8,596,295 B2 | 12/2013 | Colpan et al. |
| 2005/0067026 A1 | 3/2005 | Trentadue |
| 2007/0095406 A1 | 5/2007 | Colton, Jr. et al. |
| 2010/0308246 A1 | 12/2010 | Witkowski et al. |
| 2011/0308646 A1 | 12/2011 | Colpan et al. |
| 2013/0299727 A1 | 11/2013 | Witkowski et al. |

OTHER PUBLICATIONS

Kamezawa, Valve Opening Degree Detection Device, English Abstract of WIPO Patent Publication WO2008117344, Oct. 2, 2008, European Patent Organization, http://www.epo.org/searching/free/espacenet.html.

* cited by examiner

PRESSURE EVENT INDICATOR AND SYSTEMS INCORPORATING THE SAME

FIELD OF THE INVENTION

The present invention relates to pressure event indicator devices for signaling that a release of pressurized fluid has occurred in a pressure relief system, and more particularly to a pressure event indicator for pressurized industrial systems that may identify a pressurized vessel or pipe from which a pressurized gas was released, and systems utilizing such pressure event indicators.

BACKGROUND

Large and complex refrigeration systems are required to provide air-conditioning in large office buildings, to maintain the large storages of food at low temperatures in large warehouses, and to provide relatively low-temperature environments in other applications (e.g., pharmaceutical manufacturing). These refrigeration systems are typically closed-cycle refrigeration systems incorporating a plurality of components that cycle a refrigerant through alternate stages of compression and expansion. In some parts of the refrigeration system, the refrigerant is in a liquid state; and in other parts of the system the refrigerant is a gaseous form. The refrigeration system compressor or compressors operate to pressurize the gaseous refrigerant in the "high-pressure side" of the system. The pressure in the system pipes and other equipment on the high-pressure side can be considerably more than the outside or ambient pressure. Because these systems store and utilize fluids (i.e., gases and liquids) at relatively high-pressure, leaks and ruptures have long been concerns with such systems. Other industrial systems, including industrial boiler systems, also include closed systems that have high-pressure vessels and pipes. Such systems are generally referred to herein as "closed pressurized systems."

Ammonia is commonly used as a refrigerant in closed-cycle refrigeration systems, due to its excellent heat transferring properties, availability and low cost for large commercial operations, such as food and beverage manufacturers and distributors, pharmaceutical manufacturers, air conditioning systems for large buildings, and in electrical power generation plants. However, ammonia gas can be toxic at relatively low concentrations. Ammonia is also a moderate fire risk and is explosive when mixed with air in the 16%-25% range. In closed refrigeration systems the continuous cycle of expansion and compression of the gaseous ammonia creates a risk that the ammonia may breach the system, resulting in the escape of toxic gas. Thus, a rupture of the system could have calamitous results. Consequently, there is a need to prevent ammonia leaks in facilities using such refrigeration systems.

In large refrigeration systems, a plurality of vessels, pipes, and other components located down stream of compressors and other equipment that produce highly pressurized fluids, store and/or carry the highly pressurized fluids. In order to prevent ruptures and explosions, these vessels, pipes, and other components may each be outfitted with a pressure relief system that includes pressure relief valves to protect the components from excessive pressure. The pressure relief systems are critical components in the safety of a closed pressurized system, such as ammonia refrigeration system. The pressure relief systems maintain safe pressure levels within the system. If an abnormally high pressure occurs, a pressure relief valve will open to relieve the excess pressure, preventing potential damage to equipment and injury to personnel. Generally, the pressure relief valves will vent to the atmosphere excessive overpressure and then reseat to minimize loss of refrigerant.

Such relief valves are usually part of a pressure relief system, which may be connected to a particular pressurized vessel, pipe, or other structure containing pressurized fluid in an industrial closed-cycle refrigeration system. Industrial refrigeration systems usually include multiple pressurized structures each outfitted with a pressure relief system, and each pressure relief system may have a vent pipe that connects with a collective exhaust manifold leading to a single main exhaust pipe for releasing exhausted gas into the atmosphere. The pressure relief valves are installed in dual array arrangements in each of the pressure relief systems and are connected to a manifold within the pressure relief system which connects to the vent pipe within the pressure relief system. Such safety valve designs may include a frangible diaphragm or rupture disk upstream of each pressure relief valve. The dual arrangement of the relief valves permit one safety valve to be isolated, removed, serviced, and replaced while a second safety valve is connected to the refrigeration system so as to provide the necessary safety to operate the system. In the event of the opening of one or more of such safety valves, it has been the general practice for the operator to manually check each valve to determine where the failure occurred. This practice is not only time-consuming, but may also require that the entire refrigeration system be shut down so that each check valve may be inspected.

Pressure safety procedures in conventional ammonia refrigeration systems and other closed pressurized systems are inefficient because they utilize indicators for pressure events (e.g., rupture disk indicators) that require dismantling of the vent pipe system in order to access the ruptured disk. Such systems are also inefficient because the operator must examine each pressure relief valve system to identify where a pressure event occurred. Thus, there is a need for an improved pressure event indicator system for pressure release events in closed pressurized systems.

SUMMARY OF THE INVENTION

The present invention provides devices and methods for indicating the occurrence of a pressure event in a compressed fluid system. More particularly, the present invention relates to an inline pressure event indicator positioned downstream of one or more pressure relief valves for indicating that a pressurized fluid has passed through the pressure relief valves, and systems that utilize such a devices. The features of the present invention may be incorporated in various systems that are used in the industrial closed pressurized systems (e.g., industrial refrigeration systems, industrial boiler systems, or other industrial systems protected by pressure relief devices). The invention is particularly suitable for use in closed cycle ammonia refrigeration systems incorporating a plurality of components that cycle ammonia through high pressures that create the risk of a leak.

An installation incorporating the pressure event indicator devices of the present invention may include a plurality of discrete refrigerating apparatuses, each of which includes among its conventional components a receiver tank for receiving a pressurized refrigerant (e.g., ammonia), and various conduits carrying high pressure gas or fluid. Each such component may have associated therewith one or more pressure relief systems that include pressure relief valves set to open at a predetermined threshold pressure which is substantially below the bursting pressure of the vessel or pipe. In accordance with the present invention, a novel pressure event indicator device is connected inline with and downstream of such pressure relief valves. The indicator device includes a pressure-actuated element (e.g., a paddle) shiftable from an initial or "closed position" to an "open position" by the pressure of a fluid that passes through the upstream relief valve. The pressure event indicator device incorporates an indicator mechanism (e.g., an indicator arm) for alerting a human operator when the pressure-actuated element has been shifted from its closed position to the open position. Furthermore, the indicator mechanism is preferably constructed and positioned such that the pressure-actuated element cannot return to its home position without being manually reset, allowing the pressure event indicator device to remain open and an operator to determine that a particular relief valve has opened even though the valve may subsequently close itself.

The pressure event indicator device of the present invention may be positioned within a pressure relief system designed to exhaust a pressurized fluid when the pressure of the fluid within a vessel, pipe, or other structure in a closed pressurized system reaches a certain threshold pressure. The pressure event indicator device may include a housing that may be installed inline in a conduit (e.g., exhaust pipe) for transporting the fluid through the exhaust system. The housing may be installed inline in the fluid conduit down stream of one or more pressure release valves in the pressure relief system. Each end of the housing may be connected to a section of conduit by a joint, such as simple threading allowing the conduits and the housing to be threaded end to end. In other implementations, the housing may be connected to the conduit sections by flange joints, couplings, or other pipe fittings. However, such connections should be sufficient to prevent the escape of high pressure fluid from the joints.

The housing may have a bore or passage therethrough that is continuous with the fluid conduit when installed inline. The pressure-actuated member of the device may include a paddle mounted within the bore or passage that is attached to a rotatable axle that passes (e.g., orthogonally) through the bore or passage, and extends through the housing such that the axle may have exposed ends protruding out from the lateral sides of the housing. The paddle may be connected to the axle by welding, various fasteners (e.g., such as screws, bolts, pins, etc.), and/or other means. The paddle may have a shape that is complementary to a portion of the bore or passage, such that when the paddle is positioned perpendicularly to the path of the bore or passage, it is form-fitted to a portion of the surface of the bore leaving little or virtually no space between an outer edge of the paddle and the adjacent surface of the bore. The relatively close fit of the paddle to the bore results in occlusion of a portion of the bore without allowing the fluid to leak between the paddle's edge and the surface of the bore, so that a fluid passing through the bore exerts a significant proportion of its pressure against the paddle. Additionally, in some embodiments, the axis of the axle may pass orthogonally through the bore without passing through the central axis of the bore, like a secant passing through a circle, thereby allowing the combination of the paddle and the axle to occlude most of the cross-sectional area of the bore.

When sufficient pressure is exerted by the pressurized fluid against the paddle, the paddle may be pushed from the closed position (e.g., in which the plane of the paddle may be substantially vertical and occlude a substantial portion of the bore) to the open position (e.g., in which the paddle may be knocked down by the fluid, and occludes only a small portion of the bore). In other implementations, and without limitation, the housing and the bore may have an oblique or vertical orientation with respect to the ground, and the paddle may be oriented in various positions depending on the orientation of the bore. For example, the bore may have an oblique orientation, and in turn the paddle may have a substantially vertical orientation when it is in the closed position, such that the paddle is oblique with respect to the longitudinal axis of the bore. Various other arrangements of the housing, the bore, and the paddle are contemplated within the scope of the invention.

The pressure event indicator device may include additional features that alert a human operator that the paddle is in the open position that a pressure event has thus occurred. To illustrate, the indicator device may include one or more indicator arms that are attached to the ends of the axle that protrude from the lateral sides of the housing. The one or more indicator arms may be fixedly attached to the protruding ends of the axle, such that the one or more indicator arms are positioned at an angle (e.g., orthogonally) with respect to the plane of the paddle. This arrangement allows the arms to act as a visual indicator, notifying a human operator that a pressure event has occurred in a particular pressure relief system. For example, when a release of a pressurized fluid from an upstream pressure release valve occurs, the paddle of the pressure event indicator device may be pushed down from the closed position to the open position, and the one or more indicator arms may correspondingly move from a down position (referred to herein as the "home position") to an upright position (herein referred to as the "alert position"), and may thereby indicate to a human operator that a release of pressurized fluid through the pressure relief system has occurred. Depending on the particular implementation of the pressure event indicator device, the indicator arms may be positioned at an oblique or orthogonal angle with respect to the indicator paddle. The one or more indicator arms may have various colors, attachments, flags, etc. for capturing the attention of a human operator. For example, and without limitation, the ends of the one or more indicator arms may be painted a vibrant color, may have colorful flags attached thereto, may have reflective materials attached thereto, and/or may include other attention-grabbing features.

The indicator device of the present invention may also include one or more mechanisms for controlling the range of movement of the indicator paddle and the one or more indicator arms. In some embodiments, the indicator device may include stoppers on an exterior portion of the housing that limit the range of the one or more indicator arms. For example, the indicator device may include a pair of pegs on one or both lateral sides of the housing that are positioned such that they limit the movement of the one or more indicator arms to within a range, and thereby also limit the motion of the axle and the indicator paddle to the same range. For example, and without limitation, the range may be about 120° (e.g., in a range of about 110°, in a range of about 100°, in a range of about 90°, in a range of about 80°, or any other range less than about 120°). In other implementations, and without limitation, the stoppers may be pegs within the bore of the housing that directly limit the range of motion of the indicator paddle, and thereby also limit the range of motion of the axle and the indicator arms. Other implementations of the stoppers are contemplated within the scope of the present invention.

In some embodiments, and without limitation, the pressure event indicator device may include one or more arrestors, which hold the one or more indicator arms in the alert position once a pressure event has taken place. The arrestor(s) may ensure that the indicator arms are not inadvertently repositioned from the alert position to the home position before a human operator is alerted to the pressure event that placed the indicator arms in the alert position. The arrestor(s) may be located adjacent to the alert position of the indicator arm(s) so that the arrestor captures and holds the indicator arm in the alert position once a pressure event occurs, and until a human operator manually repositions the indicator arm(s). Without limiting the invention, the arrestor may be a magnet, a clip, a latch, or some other fastening mechanism capable of capturing one or both of the indicator arm(s) when they move into the alert position.

In some embodiments of the invention, and without limitation, the indicator device may be outfitted with one or more position sensors (e.g., photoelectric sensors, electromechanical sensors, magnetic sensors, piezoelectric sensors, etc.) for detecting when the indicator arm moves from the start position to the alert position. In other embodiments, and without limitation, the one or more position sensors may monitor the movement of the paddle or the axle. For example, and without limitation, the interior of the housing may be fitted with magnetic sensor that detects when the paddle is blown down within the bore. The one or more sensors may be in electronic communication with a processing unit (e.g., a remote computer) by a wired or wireless connection, enabling the remote computer to monitor the position of the position of the paddle in the indicator unit and whether a pressure event has occurred.

The indicator devices of the present invention may be used within closed pressurized systems such as industrial refrigeration systems, boiler systems, and other large scale systems that utilized pressurized fluids and thus require pressure relief systems for exhausting gas and preventing explosions, leaks, and other problems that may result from maintaining fluids at high pressures in closed systems. Thus, the scope of the present invention also encompasses exhaust systems that include multiple pressure relief systems, all or a plurality of which include one or more of the indicator devices disclosed herein. Such exhaust systems may be particularly suited for industrial refrigeration systems that use one or more potentially hazardous refrigerants, such as ammonia. Such exhaust systems may include multiple pressurized structures each outfitted with a pressure relief system, and each pressure relief system may have a vent pipe that connects with a collective exhaust manifold leading to a single main exhaust pipe for releasing exhausted gas into the atmosphere. The indicator devices of the present invention may be positioned within the vent pipe of one or more of the pressure relief systems. The indicator devices disclosed herein may be utilized in such systems to indicate (1) that a pressure release has occurred and (2) where the pressure event occurred (e.g., which pressure relief system released a pressurized fluid). Without limiting the invention, such an exhaust system may rely solely on the visual indication provided by the indicator arm(s) of the pressure event indicator device to determine where a pressure event occurred.

In other implementations, and without limitation, each of the indicator devices (or a fraction thereof) in the system may include position sensors for signaling a processing unit (e.g., a remote computer) when the paddle of the indicator device has been blown open by a release of fluid. The processing unit may function as or function as a part of a monitoring system that is in electronic communication with the position sensors of each indicator device. Each sensor may provide data to the monitoring system when the associated indicator arm(s) is moved into the alert position, indicating a pressure event. The monitoring system may be configured to receive and interpret the data and determine the physical location in the pressure relief system where the tripped indicator device is located, the time at which the pressure event occurred, and/or provide an alert to a human operator that indicates that the pressure release event occurred, where the tripped indicator device is physically located, and/or the time at which the event occurred. The monitoring system may also have an internal memory in which the locations of each indicator device, and the conduit, vessel, etc. through which fluid is routed to the particular indicator device are stored. The internal memory may also record data received from the position sensors of each indicator device, along with the time and the particular indicator device, and keeps and organized database of all pressure release events.

The monitoring device may include an operator interface (e.g., a touchscreen, a digital display, and/or other features), through which alerts from remote indicator devices may be communicated to an operator. The monitoring system may also be in wireless communication with various mobile computing or communication devices (e.g., without limitation, smart phones, tablets, laptops, personal digital assistants, pagers, etc.) that may be carried by human operators of the system, allowing the monitoring system to send the human operators an alert that a pressure event has occurred, including information as to where and when the event occurred.

Additional variations of the indicator device and the industrial refrigeration systems are contemplated within the scope of the present invention. For example, and without limitation, the pressure event indicator devices may be located immediately downstream of a pressure relief valve, such that each pressure relief valve is associated with a pressure event indicator device, or each pressure event indicator device may be located downstream of a manifold that connects with multiple conduits having pressure relief valves therein. Additional variations are contemplated within the scope of the present invention, some of which are discussed herein. The present description is intended as illustrative, and is not intended to limit the invention.

Embodiments of the indicator device may include a housing having a substantially horizontal elongate passage therethrough, a rotatable axle passing through the passage orthogonally to the passage, a paddle fixedly attached to the axle, the paddle having a closed position and an open position, wherein the paddle has a shape that is complementary to a portion of the passage that is adjacent to the axle and occludes the portion of the passage when the paddle is in the closed position, and the paddle is rotatable on the axle between the closed position and the open position, and at least one visual indicator outside of the housing and fixedly attached to the axle, the visual indicator being for identifying a position of the paddle. The indicator device may include one or more gaskets or O-rings (e.g., one on each end of the axle) for sealing the housing and preventing the escape of fluid from the housing. The one or more gaskets or O-rings may also cause friction and thus effectively bias the paddle to remain in the closed position or in the open position, once a pressure event has occurred. The one or more gaskets may prevent the paddle from inadvertently falling from the closed position to the open position in the absence of a pressure event. The one or more gaskets may also serve to provide friction resistance to the rotation of the axle and thereby prevent the indicator arms from falling back to the home position after a pressure event. In some embodiments, and without limitation, it may be desirable to adjust a threshold pressure at which the paddle may be blown down (e.g., a small escape of pressurized fluid from an upstream pressure release valve may not represent a significant pressure increase in the adjoined vessel or pipe carrying the pressurized fluid). In such embodiments, the one or more gaskets may also increase (to a limited degree) the threshold pressure required to move the paddle from the closed position to the open position. In further embodiments, and without limitation, the pressure event indicator may include additional features that provide limited resistance to the movement of the paddle from the closed position to the open position (and the movement of the indicator arm(s) from the home position to the alert position), such as clips that hold the indicator arm(s) in position until a threshold pressure is applied to the paddle. The indicator device may also include one or more stoppers on the exterior of the housing for limiting the range of rotational motion of the indicator arm(s) when it is moved to an alert position (e.g., substantially vertical position). The indicator device may also include an arrester (e.g., a magnet, a clip, etc.) for engaging the indicator arm(s) when the paddle opens and the visual indicator is in the alert position, and holding the paddle in the open position until the paddle is manually repositioned by a human operator. The pressure event indicator device may also include at least one sensor for detecting movement of the indicator when the paddle moves from the closed position to the open position. The sensor may be in electronic communication with and supply data to a processing unit (e.g., a remote monitoring computer or system).

Other embodiments of the present invention may be directed to indicator apparatus for a fluid piping system for indicating that a fluid at a threshold pressure has passed through the pressure event indicator apparatus. The indicator apparatus may include a housing for installation in the fluid piping system, the housing having an elongate bore therethrough, an axle running through the bore orthogonally to the length of the bore, a paddle fixedly attached to the axle, the paddle having a closed position and an open position, the paddle having a shape that occludes a portion of the bore that is between the axle and the inner wall of the bore when the paddle is in the closed position, and the paddle is rotatable on the axle between the closed position and the open position, where the paddle can be moved from the closed position to the open position by an amount of fluid passing through the bore having a pressure at least as high as a threshold pressure, and where the paddle is not biased toward the closed position when the paddle is in the open position, and at least one visual indicator outside of the housing and fixedly attached to the axle, the visual indicator being for identifying a position of the paddle. The indicator apparatus may have additional features as described herein, such as, and without limitation, a gaskets on the axle, stopper(s) for limiting the rotation of the visual indicator, an arrester holding the visual indicator and the paddle in position, and a sensor for detecting movement of the visual indicator, which may be in electronic communication with a remote monitoring computer or system, as disclosed herein. The indicator apparatus may also be installed within a relief vent line of a piping system (e.g., a pressure relief system of an industrial closed pressurized system) downstream from at least one pressure relief valve. The internal diameter of the bore of the housing may be greater than the internal diameter of the relief vent pipes of the system, to minimize a drop in pressure of the fluid across the indicator device.

Further embodiments of the present invention are directed to an industrial refrigeration system including a plurality of pressure relief systems, each having a relief vent line pipe for carrying a fluid, at least one pressure relief valve, and a pressure event indicator downstream of the pressure relief valve in the relief vent line pipe, the pressure event indicator comprising a housing installed inline in the at least one relief vent line pipe, the housing having an elongate bore therethrough, an axle running through the bore orthogonally to the length of the bore, a paddle fixedly attached to the axle, the paddle having a closed position and an open position, wherein the paddle has a shape that occludes a portion of the bore that is between the axle and the inner wall of the bore and the paddle is rotatable on the axle between the closed position and the open position, and at least one visual indicator outside of the housing and fixedly attached to the axle, the visual indicator for identifying a position of the paddle. The paddle may have a shape that is complementary to a portion of the bore, wherein the paddle can be moved from the closed position to the open position by an amount of fluid passing through the bore and having a pressure at least as high as a threshold pressure for opening the pressure relief valve. The industrial refrigeration system may have additional features as described herein, such as, and without limitation, a gaskets on the axle of the pressure event indicator, stopper(s) for limiting the rotation of the visual indicator, an arrester holding the visual indicator and the paddle in position, and a sensor for detecting movement of the visual indicator, which may be in electronic communication with a remote monitoring computer or system, as disclosed herein. The industrial refrigeration system may also include an electronic alarm system, where a sensor activates the alarm system when the sensor detects movement of the at least one visual indicator. The system described above may also be implemented in other systems in which fluids are maintained in a closed system and under elevated pressures, such as industrial boiler systems.

Further embodiments of the present invention are directed toward methods of detecting a pressure release event in a closed piping system for containing a pressurized gas, the system having at least one pressure relief valve installed inline in the piping system, that include installing a pressure event detector downstream of the at least one pressure relief valve, the pressure event indicator having a housing installed inline and downstream of the at least one pressure relief valve, the housing having an elongate bore therethrough, an axle running through the bore orthogonally to the length of the bore, a paddle fixedly attached to the axle, the paddle having a closed position and an open position, wherein the paddle has a shape that occludes a portion of the bore that is between the axle and the inner wall of the bore and the paddle is rotatable on the axle between the closed position and the open position, and at least one visual indicator outside of the housing and fixedly attached to the axle, the visual indicator for identifying a position of the paddle, and monitoring the position of the at least one visual indicator to determine when a pressure event occurs. The pressure event indicator may further include a sensor for detecting movement of the visual indicator, which may be in electronic communication with a remote monitoring computer or system, and monitoring the position of the at least one visual indicator may include automated monitoring of the position of the at least one indicator by the remote monitoring computer or system. The method may further include activating an alarm system when the sensor detects movement of the at least one visual indictor to the alert position.

It is a general object of the present invention to provide a novel monitoring system for pressure release events in a closed pressurized system or related installation utilizing pressure event indicators that are used in association with pressure relief valves, such that the location of a pressure relief event may readily be identified.

A further object of the present invention is to provide a novel monitoring system for pressure release events in a closed pressurized system that enables the identification of a specific vessel or pipe that has experienced an excessive pressure leading to a pressure release event.

A further object of the present invention is to provide a novel monitoring system that includes indicator devices that do not need to be replaced after being tripped by a release of a pressurized fluid.

A still further object of the present invention is to provide a novel pressure event indicator that is maintained in the open or tripped position after a pressure release event until an operator manually changes the position/condition of the pressure event indicator.

Still another object of the present invention is to provide a novel sensor for a monitoring system of the above-described type which will continue to provide an indication that a relief valve has opened even in the event that the relief valve subsequently closes in whole or in part.

A further object of the present invention is to provide a novel pressure relief system for industrial closed pressurized systems that does not require the replacement of components (e.g., frangible disks) after the occurrence of a pressure release event.

Still another object of the present invention is to provide a novel pressure-event indicator of the above-described type capable of providing an observable indication as to the occurrence of a pressure event.

Another object of the present invention is to provide a novel monitoring system which is of relative simple and economical construction.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Figure 1A:
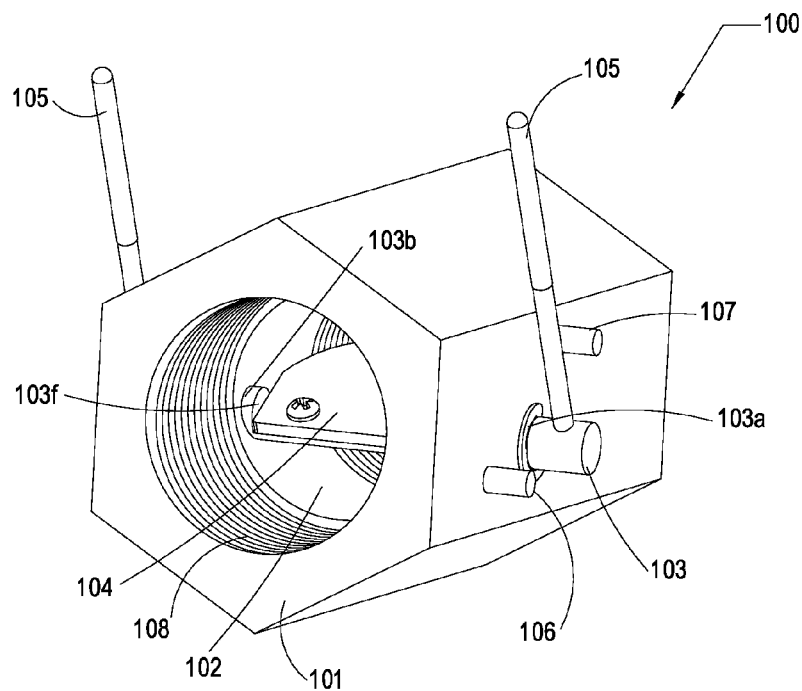
FIG. 1A is a perspective view of a pressure event indicator according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without all of the specific details provided.

The present invention concerns novel pressure event indicators for industrial closed pressurized systems that utilized pressurized fluids and methods of using the same. In some embodiments, the presently disclosed pressure event indicators may be for use in industrial refrigeration systems, but the present invention is not limited to such implementations. In other embodiments, for example, the pressure event indicators may be for use in industrial boilers or other closed pressurized systems that utilize high-pressure fluids.

The pressure event indicators of the present invention may be designed to be installed inline in a pressure relief system. For example and without limitation, the pressure event indicators of the present invention may be installed downstream of pressure relief valves in a pressure relief system, such that the pressure event indicator allows a human operator to identify which pressurized vessel or pipe has released pressurized fluid through the relief valve(s). The pressure event indicators may be configured to remain in an open alert position after a pressure relief valve upstream of the pressure event indicator has released a fluid until a human operator manually returns the pressure relief indicator to a closed position. For example, and without limitation, the pressure event indicators of the present invention may have an internal paddle structure that may occlude a majority of an internal bore of the pressure event indicator when the paddle is in the closed position. The paddle may be blown open from the closed position to the open position by the release of a fluid (e.g., gas) from a pressure relief valve upstream from the pressure relief indicator. The paddle may be fixedly attached to one or more indicator arms that may be located outside of the bore of the pressure event indicator and that may rotate with the paddle such that the indicator arms are repositioned to an alert position (e.g., an upright position, like a raised flag). When the indicator arms are moved into the alert position, a human operator may be thereby notified that a pressure event has occurred upstream of the pressure event indicator.

In some embodiments, and without limitation, the pressure event indicators may be simple mechanical devices. In other embodiments, the pressure event indicators may include a sensor (e.g., an optical sensor, a magnetic sensor, a piezoelectric sensor, etc.) that is tripped when the indicator arm is moved into the alert position. The present invention may also include a monitoring system that may include a processing unit (e.g., a remote processing unit) that is in electronic communication with the sensor of one or more pressure event indicators. In some embodiments, and without limitation, the processing unit may be remote to the one or more pressure event indicators and maybe in electronic communication with the one or more pressure event indicators by a wired or wireless connection. The processing unit may be configured to receive and interpret signals (data) from the sensor and determine whether a pressure event has occurred. The processing unit may monitor the position of the one or more pressure event indicators, and provide an alarm or alert signal when it receives data from a sensor that a pressure event indicator has been blown open by a pressure event. A monitoring system may include multiple pressure event indicators that are positioned within multiple pressure relief systems within an industrial refrigeration system or other closed system that utilizes pressurized fluid. The processing unit may be connected to a sensor of each pressure event indicator, and may be programmable to indicate a location of a pressure event and the time of its occurrence.

The above-discussed aspects of the present invention and additional aspects of the present invention are described below in reference to the embodiments illustrated in the accompanying drawings. Referring to the drawings wherein like reference characters designate like or corresponding parts throughout the several views, and referring particularly to the exemplary embodiments of FIGS. 1A-1D and 2-5, it is seen that these embodiments include a pressure event indicator (e.g., pressure event indicator 100) having a housing (e.g., housing 101), a bore (e.g., bore 102), an axle (e.g., axle 103), a paddle (e.g., paddle 104), and indicator arms (e.g., indicator arms 105). Generally, and without limitation, the paddle has a closed position (see, e.g., FIG. 1C), and an open position (see, e.g., FIG. 1D). Embodiments of the pressure event indicator may additionally include stoppers (e.g., 106 and 107) for limiting the range of movement of the indicator arms, an arrester (e.g., 211 or 311) for holding the indicator arm(s) in the alert position once a pressure event has occurred, a sensor, and various other components as described herein.

The pressure event indicators of the present invention may be implemented in various closed pressurized systems that utilize pressurized fluids, such as industrial refrigeration systems, industrial boilers, etc. Without limiting the invention, the exemplary embodiments of the pressure event indicator may be installed inline in a pressure relief system of an industrial refrigeration system. As an example, and without limiting the invention, FIGS. 1A-1D show a pressure event indicator 100 that may have an elongate housing 101, and a bore 102 therethrough to allow the passage of a fluid. The pressure event indicators may be threaded at each end of the housing to allow the indicators to be installed inline with a conduit in a closed pressurized system. For example, and without limitation, the pressure event indicator 100 shown in FIG. 1A may have internal threading (female threading) 108 at each end of the housing 101, allowing the housing to be connected inline to a conduit of a pressure relief system. The threading of the pressure event indicator may have a wider diameter than the bore, allowing the threading of the pressure event indicator to lie over threading of the conduit. In other implementations, and without limitation, the pressure event indicator may have threading on the exterior of each end thereof (male threading) for fitting within female threading in the conduit. In other embodiments, and without limitation, the pressure event indicator may have other means of being attached inline with the pressure relief system conduit, such as welds, pressure fit couplings, flange joints, or other pipe fittings or joints. In further embodiments, without limiting the invention, the pressure event indicator may be positioned in a separate pipe connected in parallel to the pressure relief system vent conduit, such as a segment of pipe that is branched off of the main conduit and that reconnects with the vent conduit downstream of the pressure event indicator.

In some embodiments, and without limitation, the bore (e.g., bore 102) of the pressure relief indicator may be continuous and concentric with the conduit of the pressure relief system. In some embodiments, and without limitation, the bore may have a diameter equal or about equal to the diameter of the conduit of the pressure relief system to thereby allow the bore to be flush with interior circumference of the conduit. In other embodiments, and without limitation, the bore may have a greater diameter than the internal diameter of the conduit, in order to minimize loss of pressure of a fluid passing from a proximal side of the bore to the distal side of the bore. The material of the surface of bore may be a corrosion-resistant metal or alloy, such as aluminum, stainless steel, nickel-based alloys, etc. In some embodiments, and without limitation, the entire body of the pressure event indicator may be made from such a corrosion-resistant metal or alloy. In other embodiments, and without limitation, a corrosion resistant coating may be applied to the bore, such as a corrosion-resistant enamel paint, a nickel coating, etc. It is to be appreciated that the bore may be machined to various sizes to accommodate the conduit size of the particular system (e.g., without limitation, 1.5 inch diameter standard pipe, 1 inch diameter standard pipe, or any other practical conduit size).

In other embodiments, the housing and/or the bore may have other shapes in order to alter or enhance the functionality of the pressure event indicator. For example, and without limitation, the housing and the bore may have a rectangular shape (e.g., square). Such a shape may allow the paddle to occlude a larger proportion of the bore, and allow for a more flush relationship between the outer edges of the paddle and the surface of the bore in comparison to a circular bore with a circular paddle (as shown in FIGS. 1A-1D). In the case of a circular bore and circular paddle, the size and/or shape of the paddle may be limited to half of the size of the cross-sectional area of the bore (a semi-circle) due to the tapering width of the circular bore. In other implementations, and without limitation, the housing and/or the bore may have various other shapes. For example, the bore may have a triangular shape, a trapezoidal shape, a semi-ellipse, a superellipse with substantially flat sides and curved corners (i.e., a squircle), or various other shapes that would allow a paddle having a complementary shape to (1) occlude more than half of the bore and (2) still be able to rotate within bore.

Figure 1B:
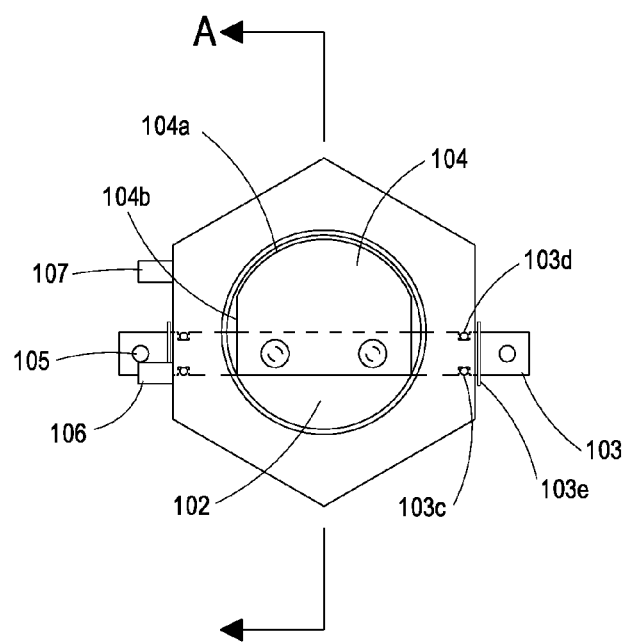
FIG. 1B is a transverse cross-sectional view of a pressure event indicator according to an embodiment of the present invention, with a paddle in a closed position.
Figure 1C:
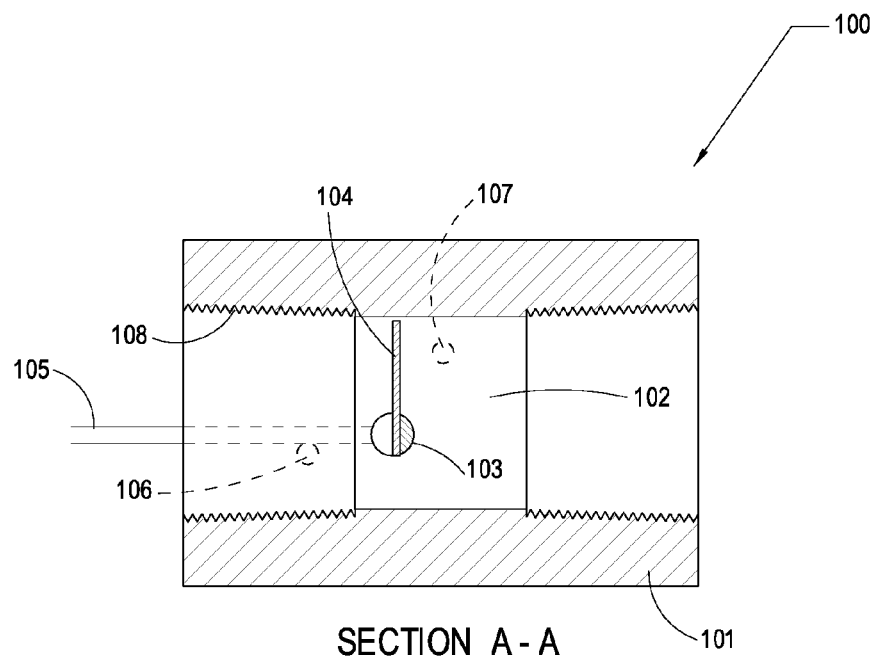
FIG. 1C is a longitudinal cross-sectional side view of the pressure event indicator of FIG. 2 along line A-A.
Figure 1D:
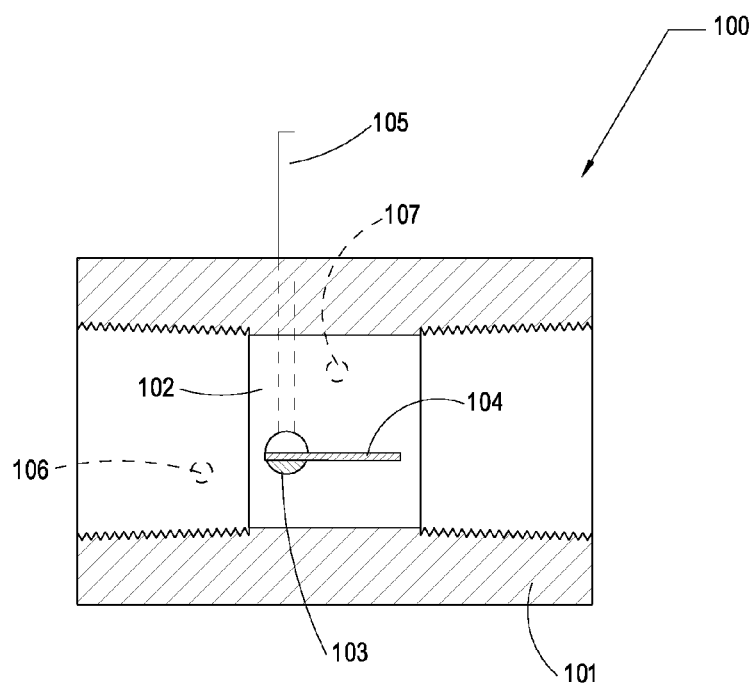
FIG. 1D is a longitudinal cross-sectional side view of a pressure event indicator according to an embodiment of the present invention.

The pressure event indicator may have an axle running transversely (orthogonally) through the bore and may protrude from each side of the housing through axle ports on each lateral side of the housing. For example, and without limitation, FIGS. 1A-1D show a pressure event indicator 100 having an axle 103 running transversely through the bore 102 and protruding from each side of the housing 100 through axle ports 103a and 103b. There may be sufficient space between the axle ports and the axle to allow the axle to freely rotate within the housing. The rotational axis of the axle may pass orthogonally through the housing without intersecting the longitudinal axis of the bore, like a secant through a circle. For example and without limitation, FIG. 1B shows axle 103 passing orthogonally through the bore 102 at a point below the central axis of the bore 102. Such an arrangement allows a paddle having cropped sides and being attached to the axle to occlude more than half of the cross-sectional area of the bore, allowing the paddle to have a larger surface area for a pressurized fluid to strike and to which to apply force.

In some embodiments, and without limitation, the axle may include gasket recesses and gaskets for sealing the bore from leaking fluid from the pressure event indicator. For example, and without limitation, FIG. 1B shows circumferential gasket recesses 103c at near each end of the axle 103, and gaskets 103d (e.g., O-rings) installed in the gasket recesses 103c. The gaskets may also provide some friction resistance between the axle and the axle ports, and thereby function to frictionally bias the axle against rotation. The axle may also include collars, which may be located on each lateral side of the axle just outside of the axle ports, thereby maintaining the axle in position in relation to the housing. For example, FIG. 1B shows an axle collar 103e attached to axle 103 and immediately adjacent to the exterior portion of the axle port 103a. It is to be understood that the axle may be held in position within the housing by various other means, such as enlarged ends of the axle that are larger in diameter than the axle ports.

The axle may have a recess or other structure for receiving a paddle therein. For example, and without limitation, the axle 103 shown in FIG. 1A includes a paddle seat 103f providing a flat surface against which the paddle 104 is positioned. The paddle may be secured in the paddle seat by various attachment means, such as screws, nuts and bolts, pins, welding, and other practical means. For example, and without limitation, the FIG. 1A shows the paddle 104 secured in the paddle seat 103f by bolts. In other implementations, and without limitation, the axle may have other various receiving structures, such as a slot into which the paddle is inserted. Alternatively, the axle may have no paddle seat or other receiving structure and the paddle may be welded to the axle. In further embodiments, the axle and the paddle may be a single cast piece, that is inserted into the bore and to which extensions may be attached through the axle ports. In still further embodiments, the paddle may have a clip-like end that snaps into position on the axle within the bore, allowing for easy assembly. It is to be understood that the present invention encompasses various other ways of combining the axle and the paddle within the bore of the housing, and that the present invention is not limited to the examples described herein.

The paddle of the pressure event indicator may be configured such that the combination of the axle and the paddle occlude a majority of the bore, thereby allowing a majority of the pressure exerted by a release of pressurized fluid from a pressure relief valve to apply force to paddle and axle. For example, and without limitation, FIG. 1B shows a paddle 104 attached to axle 103 in the upright start position within the bore 102. Because the bore 102 in the example shown in FIG. 1B is round, the paddle 104 cannot have both a perfectly or near perfect complementary shape to the bore 102 and occlude any more than half of the bore, without sacrificing the ability of the paddle to rotate on the axle. This is due to the fact that the width of the circular bore 102 tapers below the horizontal diameter of the bore 102. If the paddle was perfectly or nearly perfectly complementary to the shape of the bore and occluded more than half of the bore (e.g., the paddle has an arc length greater than 180°), the paddle would collide with the wall of the bore as it rotated from the closed position, preventing it from moving to the open position and from properly functioning.

Without limiting the invention, the example shown in FIG. 1B shows a paddle 104 that has a complementary upper edge 104a that sits about flush against a portion of the bore 102, and side portions 104b having straight edges. The straight edges 104b may allow the paddle 104 to have height that is greater than the radius of the bore without causing the paddle to collide with the surface of the bore 102 as the paddle moves from the closed position to the open position. Additionally, in the example embodiment shown in FIGS. 1A-1D, the axle 103 may be positioned below the central longitudinal axis of the bore 102, and thus the paddle 104 may be occlude more than half of the bore, and a majority of the pressure of a release of pressurized fluid may be exerted on the proximal surface of the paddle 104 when a pressure event occurs. However, it is to be appreciated that the present invention is not limited to the example shown in FIGS. 1A-1D. In some embodiments, the paddle may have a shape that occludes a greater proportion of a circular bore than that proportion occluded by paddle 104 shown in FIGS. 1A-1D. For example, and without limitation, the paddle may have multiple tapered edges that taper the sides of the paddle inward and allow the paddle to occlude a greater proportion of the bore without causing contact with the interior of the bore when the paddle rotates from the closed position. In one such example, the paddle may have straight vertical edges (e.g., like edges 104b in FIG. 1B) and additional straight edges at an oblique angle to the straight vertical edges that taper the side of the paddle inward to avoid causing contact with the interior of the bore as the paddle rotates.

In further embodiments, and without limitation, the bore may have a shape other than circular (as discussed above) that allows a paddle, having a shape that is complementary to the bore and that occludes substantially all of the bore, to rotate within bore without contacting the surface of the bore. As mentioned herein, the shape of the bore may be triangular, a trapezoidal, semi-elliptical, a superelliptical with substantially flat sides and curved corners (i.e., a squircle), or various other shapes that have either straight parallel sides or a profile that widens from top to bottom (e.g., a triangular or trapezoidal shape).

Figure 4:
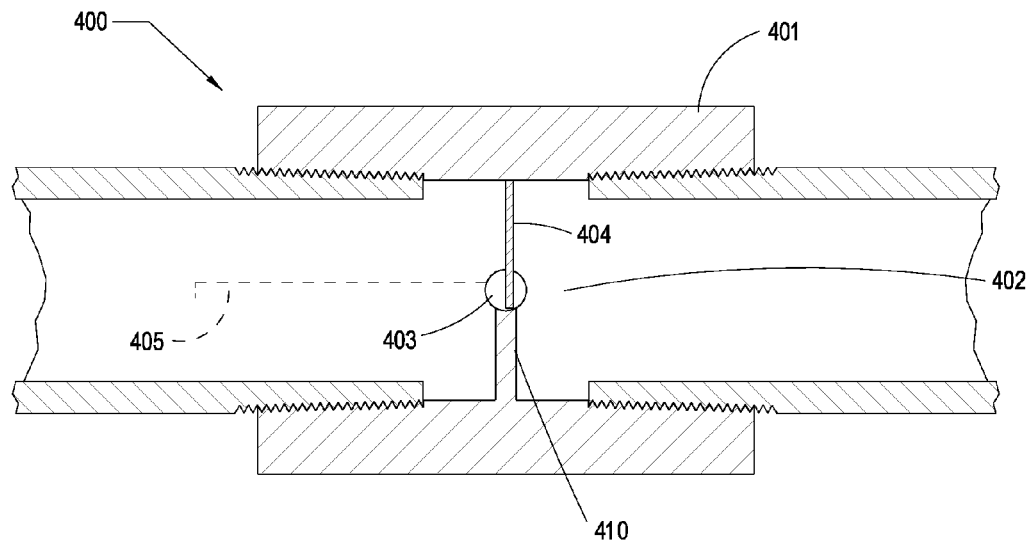
FIG. 4 is a longitudinal cross-sectional side view of a pressure event indicator according to an embodiment of the present invention.

In still further embodiments, and without limitation, the pressure event indicator may include a partially occluding wall within the bore that is adjacent to the axle. As an example, and without limitation, FIG. 4 provides a cross-sectional view of a pressure event indicator 400 having a housing 401, a bore 402, an axle 403, a paddle 404, an indicator arm 405 (represented with dashed lines, since it is positioned on the exterior of the housing 401), and an occlusion wall 410. In such embodiments, the combination of the occlusion wall, the axle, and the paddle may substantially occlude the bore when the paddle is in the closed position.

The paddle and the axle may each be made from corrosion-resistant material to avoid damage to paddle and axle that may affect the functionality of these parts (e.g., corrosion may cause rough surfaces on the axle and/or paddle that may prevent movement of these parts). For example, and without limitation, the paddle and axle may be made from a corrosion-resistant metal such as aluminum, stainless steel, nickel-based alloys, etc. In other implementations, and without limitation, the paddle and axle may be made from a corrosion-resistant ceramic or polymer material.

The pressure event indicators of the present invention may further include one or more indicator arms. The indicator arm(s) may be attached on one or both of the protruding ends of the axle and at an angle relative to the paddle. As an example, and without limiting the invention, FIG. 1C shows an indicator arm 105 positioned at 90° relative to the paddle 104. It is to be appreciated that the indicator arms may be positioned at various other angles relative to the paddle. For example, and without limitation, the indicator arm(s) may be positioned an oblique angle relative to the paddle (e.g., an acute angle in the range of about 50° to about 89°, or an obtuse angle). The indicator arm(s) are configured to visually alert a human operator that the paddle is in the open position and that a pressure release event has thus occurred in the pressure relief valve(s) upstream of the pressure event indicator. In some embodiments, and without limitation, the indicator arms are configured such that they are in a vertical or substantially vertical position when paddle is in the open position (see, e.g., FIGS. 1A and 1D). However, other configurations of the indicator arms are contemplated within scope of the invention. Additionally, the one or more indicator arms may have various colors, attachments, flags, etc. for capturing the attention of a human operator. For example, and without limitation, the ends of the one or more indicator arms may be painted a vibrant color, may have colorful flags attached thereto, may have reflective materials attached thereto, and/or may include other attention-grabbing features.

The range of motion of the indicator arms may be controlled by stoppers installed on the housing of the pressure event indicator. As an example, and without limitation, FIGS. 1A-1D show pressure event indicator 100 having stopper pegs 106 and 107 positioned on the outside housing 101. Stopper peg 106 is shown as being roughly horizontally aligned with axle 103 but vertically offset (inferiorly from the axle 103) by about the diameter of indicator arm 105. Stopper peg 107 is shown as being roughly vertically aligned with axle 103 but horizontally offset to allow the indicator arm 105 to rotate just past the vertical position so that it is unlikely that it will fall back to the home position due gravity after a pressure release event. This arrangement is particularly evident from FIGS. 1C-1D, and it limits the range of rotation of the indicator arm 105, and indirectly the rotation of the paddle 104, to just greater than about a 90° range. This limited range allows the paddle 104 to be positioned in an upright closed position without over rotation by simply moving the indicator arm 105 to where it is resting on stopper peg 106. The limited range also allows the indicator arm 105 to remain in an upright alert position after the paddle 104 is blown down by a pressurized fluid during a pressure release event.

The arrangement of the stoppers 106 and 107 in relation to the indicator arm 105 shown in FIGS. 1A-1D is exemplary, and does not limit the present invention. It is to be appreciated that other configurations of stoppers are within the scope of the present invention. For example, and without limitation, the stoppers may be arranged in relation to the axle and the indicator arm(s) such that the range of motion of the indicator arm(s) may be about 120° (e.g., in a range of about 110°, in a range of about 100°, in a range of about 90°, in a range of about 80°, or any other range less than about 120°). In other implementations, and without limitation, the stoppers may be pegs within the bore of the housing that directly limit the range of motion of the indicator paddle, and thereby also limit the range of motion of the axle and the indicator arms. Other implementations of the stoppers are also contemplated within the scope of the present invention.

Figure 2:
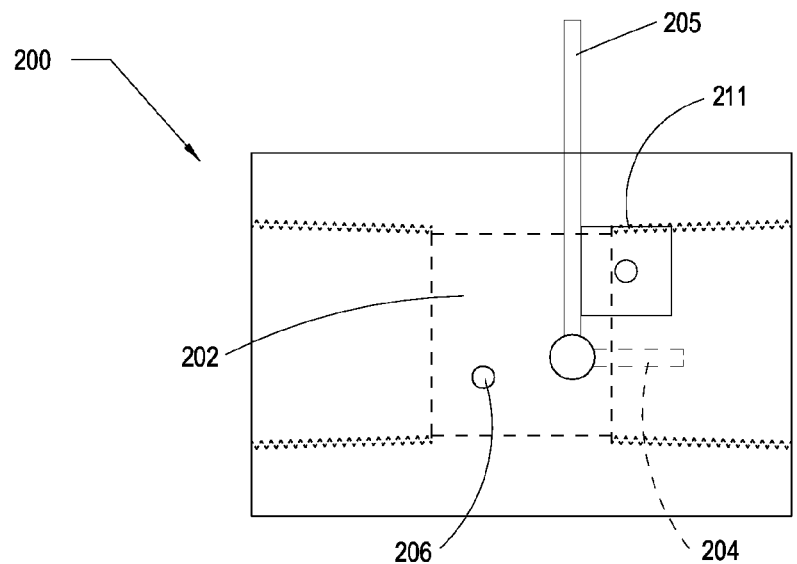
FIG. 2 is a longitudinal cross-sectional side view of a pressure event indicator according to an embodiment of the present invention.
Figure 3:
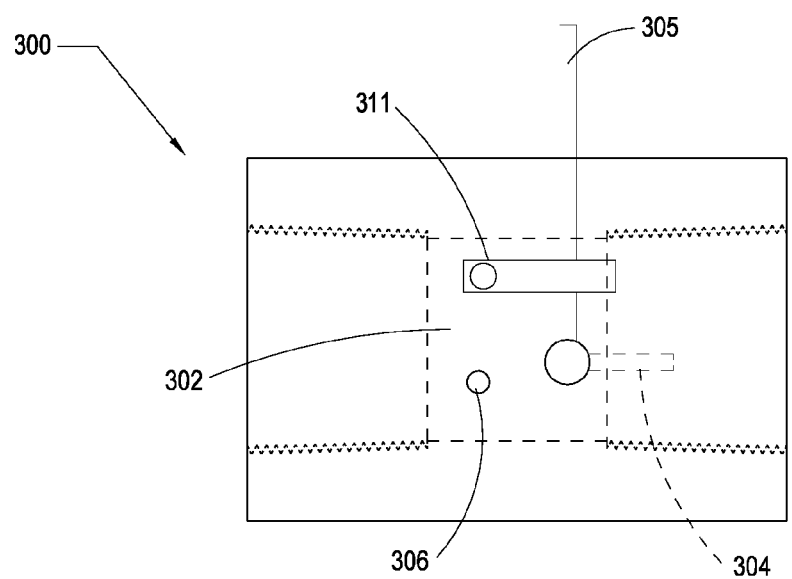
FIG. 3 is a longitudinal cross-sectional side view of a pressure event indicator according to an embodiment of the present invention.

In some embodiments, and without limitation, the pressure event indicator may include an arrester mechanism for holding the indicator arm(s) in the alert position after a pressure release event has occurred. The arrester may help to insure that the indicator arm is not reset into the home position before a human operator is visually signaled by the indicator arm that a pressure release event has occurred. As an example, and without limitation, FIG. 2 shows a pressure event indicator 200 having a bore 202, a paddle 204 in the open position, an indicator arm 205 in the alert position, a stopper peg 206, and a magnetic arrester 211 in contact with the indicator arm 205 and holding the indicator arm 205 in the alert position. In such embodiments, the indicator arm may be made from a ferrous metal (e.g., steel). As a further example, and without limitation, FIG. 3 shows a pressure event indicator 300 having a bore 302, a paddle 304 in the open position, an indicator arm 305 in the alert position, a stopper peg 306, and a spring clip arrester 311 preventing the indicator arm 305 from falling from the alert position to the home position. It is to be understood that the present invention is not limited to the examples of FIGS. 2 and 3, and that the scope of the present invention includes further examples of arrester mechanisms, such as other types of arrester mechanisms (e.g., a gravity latch, a latch bolt, etc.), or an arrester mechanism in a different location, such as a magnet arrester located within the bore. It is to be understood that not all embodiments include an arrester, and that in some embodiments, gravity acting on the paddle in the open position is sufficient to maintain the paddle in the open position and the indicator arm(s) in the alert position.

The pressure event indicators of the present invention may be installed in conduit in various locations and with various orientations (e.g., vertical, horizontal, various slopes, etc.). In some embodiments, and without limitation, a pressure event indicator may be installed in a substantially horizontal orientation within a horizontal conduit of a pressure relief system. While the present invention is not limited to implementations in which the pressure event indicators are positioned horizontally within a pressure relief system, in some instances the horizontal orientation may be preferable because the pressure event indicator can operate without the need to either (1) frictionally bias the paddle in the closed position or toward the open position, or (2) alter the shape of the paddle to accommodate a closed position in which the paddle is obliquely positioned relative to the conduit. For example, and without limitation, if the pressure relief indicator is installed in a vertical conduit, the axis of the bore would be vertical, the paddle may be positioned horizontally and may require a bias to hold it in the closed position until a pressure release event occurs (e.g., by adding a rubber gasket around the outer edge of the paddle). In a further example, and without limitation, if the pressure even indicator is installed in a sloped conduit, the paddle may be oriented at an oblique angle relative to the axis of the bore in order to be vertically oriented, in which case the shape of the paddle may be oblong to form fit the conduit when positioned vertically (i.e., at an oblique angle relative to the conduit).

Figure 5:
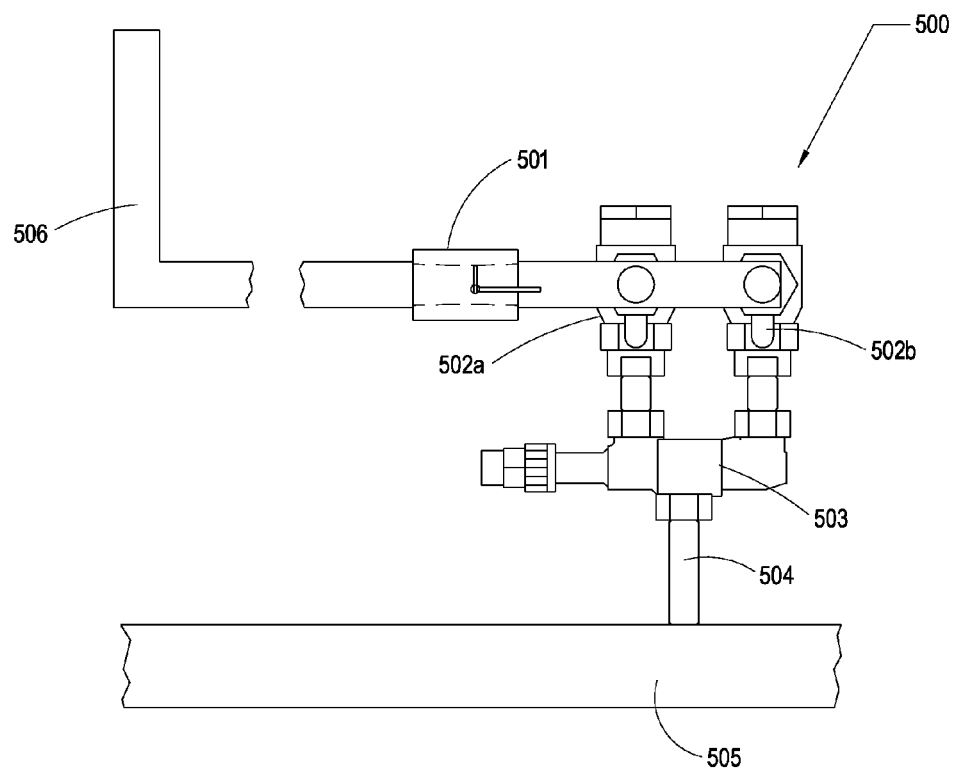
FIG. 5 is a side view of a pressure relief system according to an embodiment of the present invention.

It is also preferable, but not limiting on the present invention, that the pressure event indicators be installed downstream of one or more pressure relief valves in a pressure relief system of a closed pressurized system (e.g., an industrial refrigeration system). As an example, and without limitation, FIG. 5 shows a pressure relief system 500 of a closed pressurized system, which includes a pressure event indicator 501 downstream of paired pressure relief valves 502*a* and 502*b*. The paired pressure relief valves 502*a* and 502*b* are connected via an upstream manifold 503 and a connector pipe 504 to a single upstream pressurized vessel or pipe 505. The upstream vessel 505 may be a pressurized tank, transfer conduit, or other structure for holding and/or transferring pressurized fluid. The pressure relief system may include paired pressure relief valves attached to a single pressurized vessel, as shown in FIG. 5. If the pressure of the fluid in the pressurized vessel (e.g., vessel 505) reaches a threshold pressure sufficient to open one or both of the pressure release valves (e.g., valves 502*a* and 502*b*), the pressurized fluid passes to a vent pipe (e.g., vent pipe 506) and traverses a pressure event indicator (e.g., pressure event indicator 501) located inline in the vent pipe and knocks down the paddle and raises the indicator arm to the alert position.

Generally, closed pressurized industrial systems include a plurality (e.g., without limitation, dozens or even hundreds) of pressure relief systems (e.g., such as pressure relief system 500). The vent pipes of the pressure relief systems (e.g., vent pipe 506) may be piped into a common header for exhaustion into the atmosphere through a common exhaust pipe. Alternatively, the common header may be connected to a scrubber, or other destination. The pressure event indicators of the present invention allow a human operator to use the visual cue of the indicator arm to quickly identify which pressurized vessel experienced the excess pressure resulting in the pressure release event from the common exhaust pipe. A single pressure event indicator located downstream of the dual pressure relief valves in a pressure relief system may be sufficient to locate the source of the pressure release event because the dual pressure relief valves and the pressure event indicator are connected to a single pressurized vessel, and thus the single pressure event indicator can identify the specific pressurized vessel that experienced a fluid pressure sufficient to open one or both of the pressure relief valves.

The pressure event indicators of the present invention may include various other features that may improve and/or complement the function of the pressure event indicators. For example, and without limitation, the paddle and axle may have an anti-corrosive coating to preserve their shape and function. Additionally, the paddle may have a rubber gasket structure along its outer edge to (1) create a seal between its outer edge and the surface of the bore and (2) create friction between the paddle and the surface of bore to prevent the paddle from falling to the open position in the case of shaking or other disturbance that is not due to the release of a pressurized fluid from the pressure release valve(s) upstream of the pressure event indicator.

The pressure event indicators may also include features that function to integrate the pressure event indicators into a monitoring system that may allow a human operator to monitor a plurality of pressure event indicators remotely and/or that may generate alarm signals when a pressure event indicator is blown open by a pressure release event. In some embodiments, and without limitation, the pressure event indicators of the present invention may be outfitted with one or more position sensors (e.g., photoelectric sensors, electromechanical sensors, magnetic sensors, piezoelectric sensors, etc.) for detecting when the indicator arm moves from the home position to the alert position. For example, and without limitation, an optical sensor may be positioned near the upper stopper or arrester of the pressure event indicator that detects when the indicator arm moves into the alert position. In other implementations, and without limitation, the one or more position sensors may monitor the movement of the paddle or the axle. In further embodiments, and without limitation, the sensor may be connected to an alarm activator, such as a processing unit electronically connected to an alarm unit (e.g., a siren, a flashing light, or a combination thereof). When the sensor is tripped by the indicator arm, the alarm activator may be signaled by the sensor and then activate the alarm unit to produce light and sound to alert a human operator that a pressure release event has occurred in the pressure relief system in which the particular pressure event indicator is installed.

In other embodiments, and without limitation, the one or more sensors may be in electronic communication with a processing unit (e.g., a remote computer) by a wired or wireless connection, enabling the processing unit to monitor the position of the position of the paddle in the indicator unit and whether a pressure event has occurred. In a closed pressurized system having multiple pressure relief systems (e.g., an industrial-scale refrigeration system), the system may have a centralized monitoring system including the processing unit. The sensors of each or a plurality of the pressure event indicators in the closed pressurized system may be monitored by the centralized monitoring system allowing the identification of a pressure release event to be automated. Each sensor may provide data to the processing unit when its associated paddle is blown open. The processing unit may be configured to receive and interpret the data and determine the physical location in the closed pressurized system where the tripped indicator device is located, the time at which the pressure event occurred, and/or provide an alert to a human operator that indicates that the pressure release event occurred, where the tripped indicator device is physically located, and/or the time at which the event occurred. For example, and without limitation, the processing unit may include software therein capable of interpreting the sensor signal from a particular pressure event indicator, comparing the signal data to one or more records stored in an internal memory, and identifying a physical location of the particular pressure event indicator. The internal memory of the processing unit may store the location of each pressure event indicator device, and the conduit, vessel, etc. from which fluid is routed to the particular indicator device. The internal memory may also record data received from the position sensors of each indicator device, along with the time and the particular indicator device, and keeps and organized database of all pressure events.

The monitoring system may include an operator interface (e.g., a touchscreen, a digital display, and/or other features) connected to the processing unit, through which alerts from remote pressure event indicators may be communicated to an operator. The monitoring system may also be in wireless communication with various mobile computing or communication devices (e.g., without limitation, smart phones, tablets, laptops, personal digital assistants, pagers, etc.) that may be carried by human operators of the closed pressurized system, allowing the monitoring system to send the human operators an alert that a pressure event has occurred, including information as to where and when the event occurred.

The present invention concerns pressure event indicators that identify specific pressurized vessels or pipes from which a pressurized fluid has been exhausted, closed pressurized systems that implement such pressure event indicators, and methods of using such pressure event indicators. The pressure event indicators may be actuated when a pressurized fluid is released through one or more pressure relief valves in a pressure relief system. The pressure event indicators may be installed inline in an exhaust pipe of the pressure release system, downstream from one or more pressure release valves. Unlike conventional technologies for determining whether a pressure release event has occurred (e.g., frangible disks), the pressure event indicators of the present invention readily identify the pressurized vessel or pipe which experienced the elevated (e.g., unacceptably high) fluid pressure. The pressure event indicators described herein beneficially provide a device that can allow a human operator to quickly identify a pressurized vessel or pipe that has experienced and elevated pressure, thereby allowing the human operator to quickly take safety measures.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

It is to be understood that variations and modifications of the present invention may be made without departing from the scope thereof. It is to be appreciated that the features disclosed herein may be used different combinations and permutations with each other, all falling within the scope of the present invention. It is also to be understood that the present invention is not to be limited by the specific embodiments disclosed herein, but only in accordance with the appended claims when read in light of the foregoing specification.

What is claimed is:

1. An indicator device, comprising:
   a. a housing having an elongate passage therethrough;

b. a rotatable axle passing through the passage orthogonally to said passage;
c. a paddle fixedly attached to, and rotatable on, said axle, said paddle having a closed position and an open position, wherein said paddle has a shape that is complementary to a portion of said passage that is adjacent to said axle and occludes said portion of said passage when said paddle is in the closed position, and
  wherein said axle defines an axis of rotation of said paddle between said open position and said closed position, wherein said paddle can be moved from said closed position to said open position by fluid passing through said passage, no bias is applied to said axle or said paddle to return said paddle to said closed position from said open position, and said paddle remains in said open position until said paddle is manually repositioned to said closed position; and
d. at least one visual indicator outside of said housing and fixedly attached to said axle and rotatable about said axis of rotation of said paddle for identifying a position of said paddle.

2. The device of claim 1, further comprising a gasket on said axle and adjacent to a wall of said housing, wherein said gasket frictionally resists rotation of said axle.

3. The device of claim 1, wherein said at least one visual indicator comprises an elongate structure that rotates about said axis of rotation into an alert position for signaling an occurrence of a pressure release event when said paddle rotates into said open position.

4. The device of claim 3, further comprising a stopper for limiting the rotational motion of said elongate structure, said stopper on an exterior of said housing and positioned such that said stopper stops rotation of said elongate structure when the elongate structure is in said alert position.

5. The device of claim 1, further comprising an arrester for engaging said at least one indicator when said paddle is in said open position, wherein said arrester holds said paddle in the open position.

6. An indicator apparatus for a fluid piping system for indicating that a pressurized fluid has been released from a pressure relief valve, the indicator apparatus comprising:
a. a housing for installation in said fluid piping system downstream of said pressure relief valve, said housing having an elongate bore therethrough;
b. an axle running through said bore orthogonally to said bore;
c. a paddle fixedly attached to said axle, said paddle having a closed position and an open position, said paddle having a shape that occludes a portion of said bore that is between said axle and an inner surface of a wall of said bore when said paddle is in said closed position, and said paddle is rotatable on said axle between said closed position and said open position,
  wherein said paddle can be moved from said closed position to said open position by fluid passing through said bore, and
  wherein said paddle is not biased toward the closed position when said paddle is in said open position, and said paddle is held in the open position by gravity until said paddle is manually repositioned to said closed position; and
d. at least one visual indicator outside of said housing and fixedly attached to said axle, said visual indicator being for identifying a position of said paddle.

7. The apparatus of claim 6, further comprising a gasket on said axle and adjacent to said wall of said bore, wherein said gasket frictionally resists rotation of said axle.

8. The apparatus of claim 6, wherein said at least one visual indicator comprises an elongate structure that rotates into an alert position for signaling an occurrence of a pressure release event when said paddle rotates into said open position.

9. The apparatus of claim 8, further comprising a stopper for limiting the rotational motion of said elongate structure, said stopper on an exterior of said housing and positioned such that said stopper stops rotation of said elongate structure when the elongate structure is in said alert position.

10. The apparatus of claim 6, further comprising an arrester for engaging said at least one visual indicator when said paddle is in said open position, wherein said arrester holds said paddle in the open position until said paddle is manually repositioned to said closed position.

11. The apparatus of claim 6, wherein said housing is for installation in a relief vent line of said piping system.

12. The system of claim 11, wherein a diameter of said bore is greater than an internal diameter of said relief vent line.

13. An industrial refrigeration system comprising:
a plurality of pressure relief systems each having a relief vent pipe for carrying a fluid, a pressure relief valve, and a pressure event indicator downstream of said pressure relief valve, said pressure event indicator comprising
  i. a housing installed inline in said relief vent pipe, said housing having an elongate bore therethrough;
  ii. an axle running through said bore orthogonally to said bore;
  iii. a paddle fixedly attached to said axle, said paddle having a closed position and an open position, wherein said paddle has a shape that occludes a portion of said bore that is between said axle and an inner surface of a wall of said bore and said paddle is rotatable on said axle between said closed position and said open position, wherein no bias is applied to said axle or said paddle to return said paddle to said closed position from said open position, and
  iv. at least one visual indicator outside of said housing and fixedly attached to said axle, said visual indicator for identifying a position of said paddle.

14. The system of claim 13, wherein said axle does not intersect a longitudinal axis of said bore.

15. The system of claim 13, wherein said paddle shape is complementary to a shape of said portion of said bore, wherein said paddle can be moved from said closed position to said open position by fluid passing through said bore.

16. The system of claim 15, wherein said paddle remains in said open position until said paddle is manually repositioned to said closed position.

17. The system of claim 13, further comprising a gasket on said axle and adjacent to said wall of said bore, wherein said gasket frictionally resists rotation of said axle.

18. The system of claim 13, wherein said at least one visual indicator comprises an elongate structure that rotates into an alert position for signaling an occurrence of a pressure release event when said paddle rotates into said open position.

19. The system of claim 18, further comprising a stopper for limiting the rotational motion of said elongate structure, said stopper on an exterior of said housing and positioned such that said stopper stops rotation of said elongate structure when said elongate structure is in said alert position.

20. The system of claim 13, further comprising an arrester for engaging said at least one indicator when said paddle is in said open position, wherein said arrester holds said paddle in the open position until said paddle is manually repositioned to said closed position.

21. The system of claim 13, wherein said paddle is held in the open position by gravity until said paddle is manually repositioned to said closed position.

22. The system of claim 13, wherein a diameter of said bore is greater than an internal diameter of said relief vent pipe.

23. The apparatus of claim 6, wherein said paddle is positioned above said axle when said paddle is in said closed position.

24. The system of claim 13, wherein said paddle is positioned above said axle when said paddle is in said closed position.

25. An indicator device, comprising:
   a. a housing having an elongate passage therethrough;
   b. a paddle fixedly attached to an axle, said paddle having a closed position and an open position and rotatable on said axle between said closed position and said open position,
      wherein in said closed position, said paddle occludes a portion of said passage and is positioned above said axle, and
      wherein in said open position, no bias is applied to said axle or said paddle to return said paddle to said closed position, wherein said paddle can be moved from said closed position to said open position by fluid passing through said passage and said paddle is held by gravity until said paddle is manually repositioned to said closed position; and
   c. at least one visual indicator that rotates with said axle for identifying a position of said paddle,
      wherein each said paddle and said visual indicator rotate about an axis of rotation defined by said axle.

26. The indicator device of claim 25, wherein said at least one visual indicator comprises an elongate structure that rotates about said axis of rotation into an alert position for signaling an occurrence of a pressure release event when said paddle rotates into said open position, and said indicator device further comprises a stopper for limiting the rotational motion of said elongate structure, said stopper on an exterior of said housing and positioned such that said stopper stops rotation of said elongate structure when the elongate structure is in said alert position.

27. The indicator device of claim 25, wherein said at least one visual indicator comprises an elongate structure that rotates about said axis of rotation into an alert position for signaling an occurrence of a pressure release event when said paddle rotates into said open position, and said indicator device further comprises an arrester for engaging said at least one visual indicator when said paddle is in said open position, wherein said arrester holds said paddle in the open position.

28. The indicator device of claim 1, wherein said paddle is positioned above said axle when said paddle is in said closed position and held in said open position by gravity.

29. The indicator device of claim 1, wherein said axis of rotation does not intersect a longitudinal axis of said bore.

30. The indicator device of claim 1, wherein said axis of rotation is fixed relative to said housing.

* * * * *